April 5, 1932.  F. C. BLANCHARD  1,852,229

OILING SYSTEM

Filed April 27, 1921

Inventor:
Frederick C. Blanchard,
by Emery, Booth, Janney & Varney
Attys.

Patented Apr. 5, 1932

1,852,229

UNITED STATES PATENT OFFICE

FREDERICK C. BLANCHARD, OF DETROIT, MICHIGAN

OILING SYSTEM

Application filed April 27, 1921. Serial No. 465,039.

This invention relates to oiling systems for machines having a plurality of bearings intended to be lubricated continuously, the system being preferably though not necessarily self-contained with or driven by the machine to be lubricated, varying in speed therewith and starting and stopping therewith, so as to be automatic in its cooperative relation with the machine to be lubricated.

The invention will be best understood by reference to the following description, when taken in connection with the accompanying drawings of one illustrative embodiment thereof, while its scope will be more particularly pointed out in the appended claims.

Figure 1:
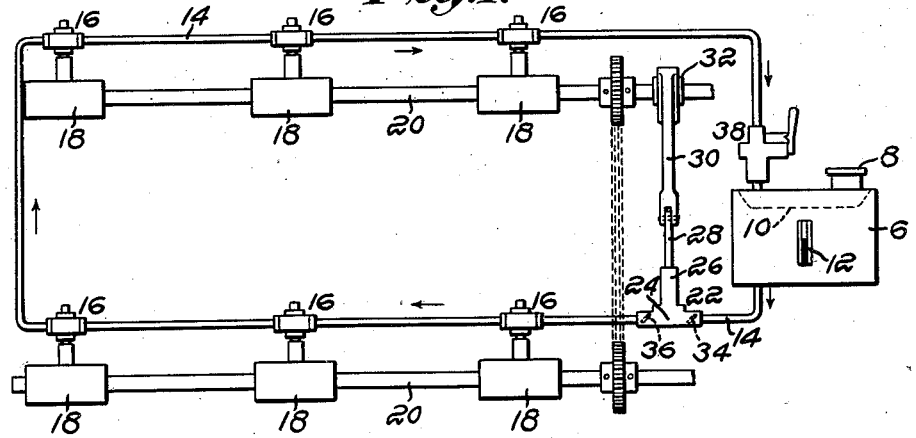
Fig. 1 is an elevation of an oiling system exemplifying my invention.

Referring to the drawings, and to the embodiment of the invention which is selected for exemplification, there is shown an oiling system having a reservoir 6 equipped with suitable provision for the introduction of oil, as a filling cap 8. The reservoir is preferably provided with a strainer 10 to strain the oil introduced thereinto, and a suitable level indicator, herein a gage glass 12. The reservoir supplies a conduit 14 having a plurality of outlets, herein exemplified by feed nozzles each designated generally by the numeral 16, which deliver oil to corresponding bearings conventionally represented at 18, in which one or more shafts 20 may be journaled. Oil is circulated by a suitable pump designated generally by the numeral 22, which may be of any desired type, the one herein shown being of the reciprocating type, and having a casing 24 presenting a cylinder 26, in which a plunger or piston 28 is mounted to reciprocate, and is operated by any appropriate means, herein an eccentric rod 30 and an eccentric 32, the latter being driven by any suitable source of power, preferably that of the machine to be lubricated, the eccentric to that end being herein secured to one of the shafts 20. The pump furnishes a pulsating pressure, and its speed is proportional to that of the machine and starts and stops therewith. Preferably the pump is located below the reservoir, and is therefore always primed. The pump draws oil from the reservoir at a point below the level of the oil therein, and is provided with any usual inlet and outlet check valves 34 and 36, which cause the oil to travel through the conduit and nozzles in series in the direction indicated by the arrows. The oil, minus the amount supplied to the bearings, returns to the reservoir, passing first through a pressure regulator 38, thence through the screen, and thence to the pump, where it is again circulated through the system.

Figure 2:
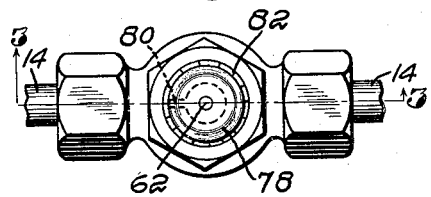
Fig. 2 is a plan of one of the feed nozzles on an enlarged scale.
Figure 3:
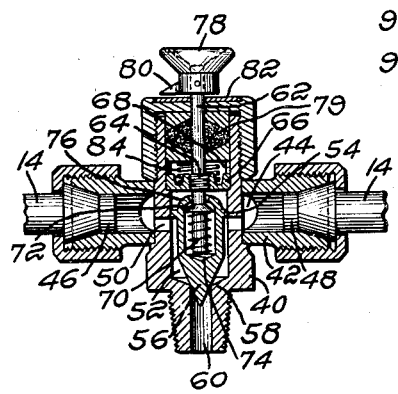
Fig. 3 is a sectional view on line 3—3 of Fig. 2.

The preferred form of feed nozzle will now be described, reference being had to Figs. 2 and 3. The nozzle is herein provided with a casing conveniently comprising two parts, 40 and 42, the latter encircling the former and provided with an annular passage 44, through which the oil passes on its way from an inlet 46 to an outlet 48. This annular passage communicates through one or more, herein a plurality of, openings 50 with a chamber or cylinder 52 having a piston 54 working therein. Said piston carries a suitable valve, herein a needle valve 56, cooperating with a seat 58 to control the flow of oil from the cylinder to an outlet passage 60 leading to the bearing to be lubricated.

The valve is raised and lowered by the pulsations of pressure in the system due to the reciprocation of the pump plunger. This is because the under side of the piston 54 is subject to the pressure of the oil therebeneath, as will be evident from an inspection of Fig. 3. The height to which the piston can be lifted and consequently the extent to which the needle valve can be opened is determined by a suitable stop 62, which is preferably manually adjustable, to the end that the normal rate of discharge from the nozzle may be regulated at will. In the present example, the stop is the lower end of a stem 62, whose height is conveniently varied by providing the same with a screw-threaded portion 64 threaded into a nut 66 having non-rotative connection with the valve casing as by splines 68. Since the nut cannot rotate and is normally held against axial movement, rotation of the stem is accompanied by lengthwise movement of the latter. Opening movement of the needle valve is yieldingly resisted by a suitable spring 70, herein helically coiled about the stem and seated at one end against a shoulder 72 formed on the stem, and at its other end against the lower end of a chamber 74 in which the spring is received. Above the shoulder 72, the piston is provided with an inwardly projecting flange 76, which overlies the shoulder, whereby, when the stem is lifted and the shoulder brings up against the flange, the piston is lifted by the stem.

The stem is provided externally of the valve casing with a suitable handle, herein a knob 78, by means of which the stem may be rotated to make the desired adjustment of the rate of feed. A packing 79 may be provided about the stem to prevent leakage and to maintain the adjustment of the stem by frictional engagement therewith. An appropriate indicator may be provided to indicate the approximate or relative amount of oil being fed, such indicator in the present example comprising a pointer 80 carried by the knob 78 and cooperating with a suitably graduated dial 82.

Suitable provision is made for temporarily superseding the normal rate of feed by an increased rate. This may be accomplished either manually at each individual nozzle, or collectively at all of the nozzles. To this end, the nut 66 is mounted to slide axially, and its upward movement is normally resisted by a spring 84, whose strength is relatively greater than that of the spring 70. When, therefore, in the normal operation of the device, the valve is lifted by the pulsations of pressure, the lower end of the stem serves to limit the valve to a certain predetermined opening. When, however, an abnormal pressure is developed in the system by the use of a pressure regulator presently to be described, the nut 66 is lifted in opposition to the spring 84, and thus permits an increased valve opening. This, of course, affects all of the valves in the system, and by this means, all of the bearings are flushed. This may be desirable, for example, when a machine is first started into operation, and the bearings are dry. Should it be found desirable to flush any particular bearing independently of the others, this may be accomplished manually by simply grasping the knob of the valve in question and lifting the latter. Whichever means is employed for flushing the bearing, as soon as the nut is allowed to seat under the influence of the spring 84, there will be an automatic resumption of the normal rate of discharge.

Figures 4, 5:
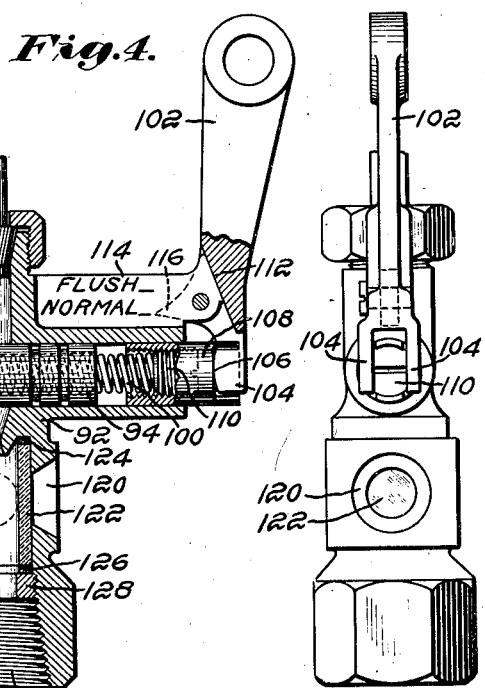
Fig. 4 is a sectional view of the pressure regulating valve.
Fig. 5 is an elevation of the regulating valve as viewed from the right-hand side of Fig. 4.

The pressure regulator will now be described, reference being had to Figs. 4 and 5. The regulator in the present example, comprises a casing 86 having an inlet 88 and an outlet 90, said casing presenting a cylinder 92 in which is mounted a piston 94 which controls the passage of oil from the inlet to the outlet. This piston can never entirely close the passage, but a restricted opening is left by providing the piston with a reduced end 96, which normally abuts against a fixed stop 98 conveniently in the form of a plug threaded into the casing. A spring 100 normally seats the piston against the stop, but yields when the pressure tends to rise above a predetermined point, thereby increasing the size of the restricted opening and allowing a greater amount of oil to flow past the end of the piston, thus maintaining a certain or constant range of pulsating pressure in the system,—i. e. from atmospheric pressure to a maximum as determined by the adjusted load on the spring 100. This pressure may be temporarily increased for the purpose of flushing all of the bearings simultaneously by manually increasing the resistance presented by the spring, or holding the piston against its seat. In the present example, this is conveniently accomplished by the use of a lever 102 bifurcated to present a pair of arms 104, which rest against shoulders 106 presented by a tubular plunger 108 internally threaded to receive a correspondingly threaded plug 110, which presents an abutment for the outer end of the spring. When, therefore, the upper end of the lever is swung toward the right in Fig. 4, the plunger is moved inward, thereby compressing the spring to a greater extent, or if desired, holding the piston against its seat. Outward movement of the piston may be limited by any suitable means, as a fixed stop 112 conveniently formed on a rib 114, which extends between the arms 104. If desired, means may be provided to indicate the normal and flushing positions of the lever, and in the present example, the latter is to this end provided with a pointer 116, while the rib 114 is inscribed with the words "Flush" and "Normal" suitably placed to correspond with the normal and flushing positions of the lever. It should be understood, of course, that the spring is of sufficient strength to determine the maximum pressure of the normal pulsation, and to prevent any substantial increase of pressure above that point.

The stream of oil passing the piston flows through a nozzle-shaped opening 118, and may be observed through one or more, herein a plurality of windows 120 presented by the casing and surrounding a glass tube 122 having its ends seated against packing washers 124 and 126, and held in place by a hollow screw 128 threaded into the casing. The flow of oil observed through the windows serves as an indication that the system is functioning.

The general operation of the system should be evident without further description. The system has many advantages as compared with other oiling systems. Oil is supplied to a plurality of bearings independently of each other, but in a cooperative manner, each bearing being kept supplied with oil under any given pressure and at any adjusted rate. This rate may be increased for any desired period in all of the bearings, or if desired any particular bearing may be given a temporarily increased supply of oil independently of the others. In any event, the adjusted rates of feed are automatically restored when the temporary increase ceases. The use of force feed is desirable, because the reservoir may be placed at any convenient point for filling, and the regulator at some convenient point for adjustment and observation of the pressure and feed. For a given setting of feed adjustment, the normal rate of feed remains substantially constant, despite variation in the viscosity of oil consequent upon temperature changes. Another advantage of the force feed system is that sufficient pressure is developed to clear the pipe lines of obstructions such as dirt, waste, sediment, and heavy oil ingredients or impurities. By the use of a machine having a self-contained system in which the pump is driven by the machine and varies in speed therewith, and starts and stops therewith, no attention is ordinarily required on the part of the operator. Moreover, all of the outlets are closed immediately the machine and its pump stop. However, if a machine is cold, all of the bearings may be flushed with oil when starting, or any individual bearing showing distress may be flushed until relieved.

Having thus described one embodiment of the invention, but without limiting myself thereto, what I claim and desire by Letters Patent to secure is:

1. In an oiling system, the combination of a reservoir for a supply of oil, a conduit leading from said reservoir past a series of bearings where it has outlets and from the last outlet back to said reservoir, a pump for circulating oil through said conduit and reservoir, and means presenting a constantly open valve interposed in said conduit between the last outlet of the series and the reservoir, and means presenting a yielding resistance to the further opening of said valve under the influence of the pressure in said conduit.

2. A circulatory oil system having a series of outlets for supplying bearings, means for circulating oil under pressure past said outlets, means at each outlet normally maintaining an established rate of discharge, and other means at each outlet for temporarily superseding such rate by an increased rate at such outlet.

3. A circulatory oil system having a series of outlets for supplying bearings, means for circulating oil under pressure past said outlets, yielding means at each outlet normally maintaining an established rate of discharge, and means for temporarily increasing the oil pressure opposed to said yielding means, thereby superseding such rate by an increased rate at all of said outlets conjointly.

4. A circulatory oil system having a series of outlets for supplying bearings, means for circulating oil under pressure past said outlets, yielding means at each outlet responsive to the oil pressure, for normally maintaining an established rate of discharge proportioned to such pressure, and means for causing a temporary increase of the oil pressure without change of speed of said circulating means, thereby to cause a temporarily increased rate of discharge at all of said outlets.

5. A circulatory oil system having a series of outlets for supplying bearings, means for normally circulating oil under pressure past said outlets, and means for causing the temporary flushing of any particular bearing and the automatic restoration of the normal feeding rate following the flushing of such bearing.

6. A circulatory oil system having a series of outlets for supplying bearings, means for normally circulating oil under pressure past said outlets, and means for causing the temporary flushing of all of said bearings simultaneously and the automatic restoration of the normal feeding rate following the flushing of said bearings.

7. A circulatory oil system having a series of outlets for supplying bearings, means for normally circulating oil under pressure past said outlets, means for causing the temporary flushing of any particular bearing followed by the automatic restoration of the normal flow to such bearing, and means for causing the temporary flushing of all of said bearings simultaneously followed by the automatic restoration of the normal flow to all of said bearings.

8. A circulating oil system having a series of outlets for supplying bearings, means for normally circulating oil under pressure past said outlets, means for automatically maintaining a normal rate of discharge of oil at each outlet, and manually operable means for causing such normal rate to be temporarily superseded by an increased rate followed by the automatic resumption of said normal rate.

9. A circulating oil system having a series of outlets for supplying bearings, means for normally circulating oil under pressure past said outlets, means for automatically maintaining a normal pressure of the oil flowing past said outlets, and manually operable means for causing such normal pressure to be temporarily superseded by an increased pressure followed by the automatic resumption of said normal pressure.

In testimony whereof, I have signed my name to this specification.

FREDERICK C. BLANCHARD.